United States Patent [19]

Golan et al.

[11] 4,324,274
[45] Apr. 13, 1982

[54] SELECTOR VALVE

[75] Inventors: Kenneth F. Golan, Pekin; Charles N. Goloff, Secor; James L. Schmitt, Metamora, all of Ill.

[73] Assignee: Caterpillar Tractor Co., Peoria, Ill.

[21] Appl. No.: 261,110

[22] PCT Filed: Oct. 17, 1980

[86] PCT No.: PCT/US80/01398
§ 371 Date: Oct. 17, 1980
§ 102(e) Date: Oct. 17, 1980

[51] Int. Cl.³ .............................................. F15B 13/06
[52] U.S. Cl. ........................... 137/625.68; 137/625.69; 192/87.13
[58] Field of Search ...................... 137/625.68, 625.69; 192/87.13, 87.18, 87.19

[56] References Cited

U.S. PATENT DOCUMENTS

| 3,207,182 | 9/1965 | Edmunds | 137/625.68 |
| 3,274,858 | 9/1966 | Meyer et al. | |
| 3,586,054 | 6/1971 | Michael | 137/625.68 |
| 3,618,727 | 11/1971 | Cornet | 192/87.13 |
| 4,294,287 | 10/1981 | Boswell | 137/625.69 |

Primary Examiner—Gerald A. Michalsky
Attorney, Agent, or Firm—John W. Grant

[57] ABSTRACT

A selector valve (10) for providing a plurality of fluid signals has a plurality of signal ports (17-22) and a pair of drain ports (23,24) opening into a bore (14) of a body (11) and are angularly spaced one from another in a plane normal to the axis of the bore (14). A spool (12) is reciprocatable within the bore (14) between a plurality of positions. At each position at least one of a plurality of radial passages (48-57) in the spool (12) communicates an inlet passage (25) with a manifold (41), another of the radial passages communicates the manifold (41) with one of the signal ports (17-22) and one or more of a plurality of arcuate pockets (60-68) in the spool (12) communicate the other signal ports (17-22) with the drain ports (23,24). By angularly spacing the signal ports (17-22) and positioning the radial passages (48-57) in the spool (12) for selective communication with the signal ports (17-22) at the various positions on the spool (12), a plurality of signals can be obtained with a relatively short travel distance of the spool (12).

7 Claims, 29 Drawing Figures

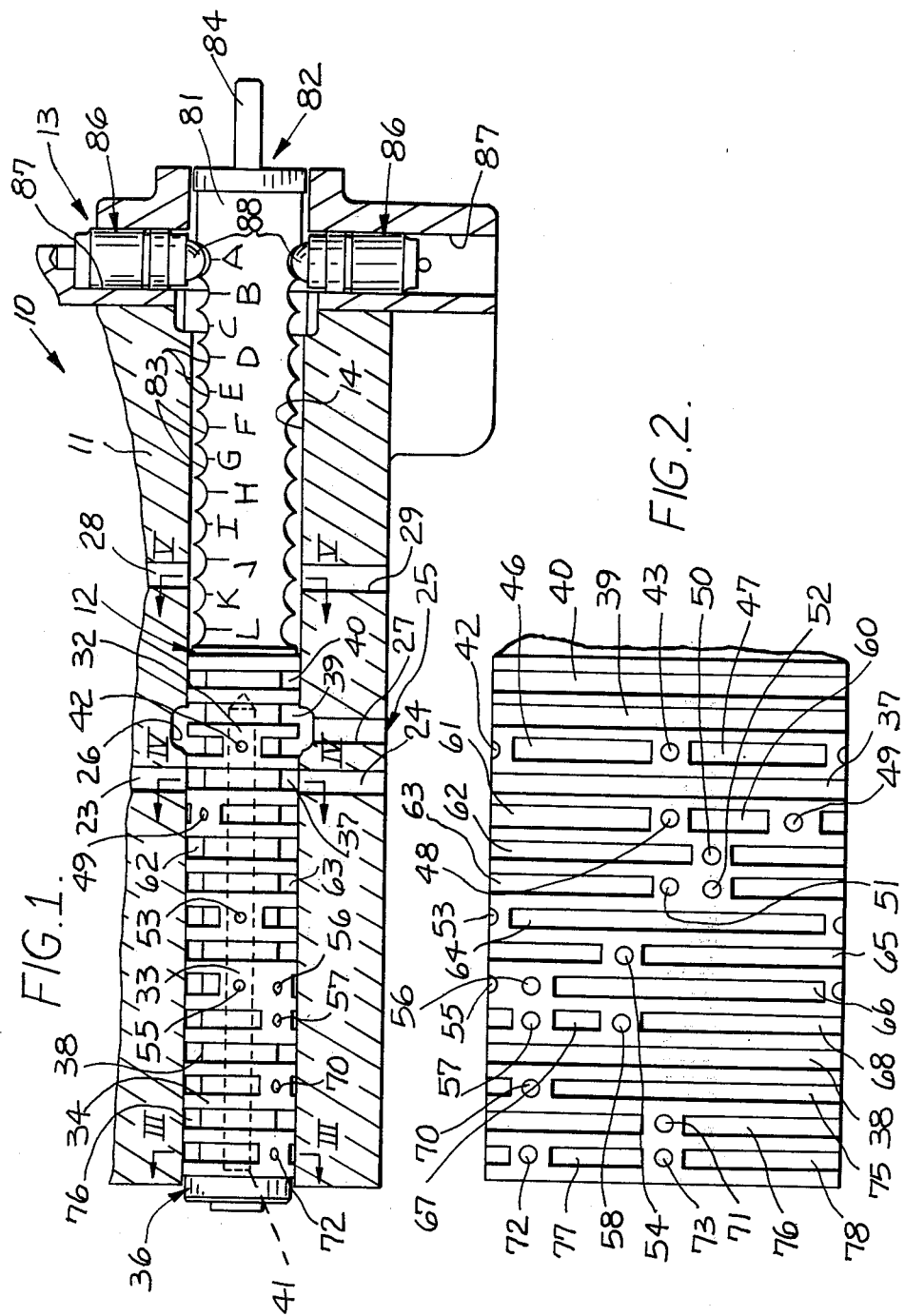

4,324,274

SELECTOR VALVE

DESCRIPTION

1. Technical Field

This invention relates generally to control valves and more particularly to a multi-position selector valve which provides a plurality of output signals with a minimum travel distance of the spool.

2. Background Art

Many multi-speed power shift transmissions such as the one shown in U.S. Pat. No. 3,274,858 issued to R. J. Meyer, et al on Sept. 27, 1966 utilize a multi-position selector valve for shifting the transmission between the various speeds. Such selector valves commonly direct pilot fluid signals to various shuttle valves or combination of shuttle valves which, in turn, direct pressurized fluid to the clutches. One of the problems encountered with the selector valve shown in that patent is that it needs separate drain and pressure passages and the travel length of the selector valve spool is excessive, particularly when used with transmissions having up to ten forward speeds.

The present invention is directed to overcoming one or more of the problems as set forth above.

DISCLOSURE OF THE INVENTION

In one aspect of the present invention a selector valve includes a body having a bore, first and second signal ports, a drain port, and an inlet passage. The first and second signal ports and drain port open into the bore and are angularly spaced one from another in a plane normal to the axis of the bore. The inlet passage is in communication with the bore and is longitudinally spaced from the signal ports and the drain port. A spool has a manifold, first and second lands, and an annular groove positioned between the first and second lands. The first land has a radial passage while the second land has a first radial passage and a first arcuate pocket in circumferential alignment and a second radial passage and a second arcuate pocket in circumferential alignment. The second radial passage is longitudinally spaced from the first radial passage. The first, and second radial passages are in communication with the manifold. The spool is reciprocatably positioned within the bore and is movable longitudinally along its axis between first second and third positions. At the first position, the first and second signal ports are in communication with the drain port through the annular groove. At the second position, the radial passage of the first land is in communication with the inlet passage, the first radial passage of the second land is in communication with the first signal port, and the second signal port is in communication with the drain port through the first arcuate pocket in the second land. At the third position the first radial passage of the second land is in communication with the inlet passage, the second radial passage of the second land is in communication with the second signal port and the first signal port is in communication with the drain port through the second arcuate pocket of the second land.

By angularly positioning the signal ports and the drain ports within the same plane and providing the valve spool with radial passages positioned for selective communication with one or more of the signal ports, arcuate pockets to communicate the remaining signal ports with the drain ports and utilizing the radial passages in the valve spool for communicating the inlet passage with the manifold within the valve spool, the travel length of the valve spool is drastically reduced.

BRIEF DESCRIPTION OF THE DRAWINGS

FIG. 1 is a diagrammatic sectional view of a selector valve encompassing an embodiment of the present invention.

FIG. 2 is a flat plan view of the valve spool.

BEST MODE FOR CARRYING OUT THE INVENTION

Referring now to FIG. 1, a selector valve is shown at 10 and includes a valve body 11, a valve spool 12 and detent means 13 for retaining the spool 12 in a preselected position.

Figure 3A:
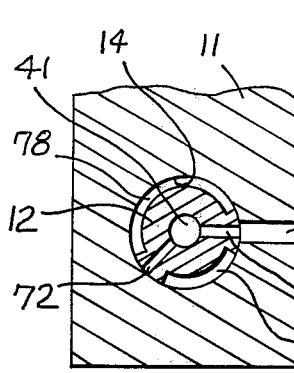
FIG. 3A–3C are sectional views taken along line III—III of FIG. 1 with the letters used to designate different positions of the valve spool.
Figure 4A:
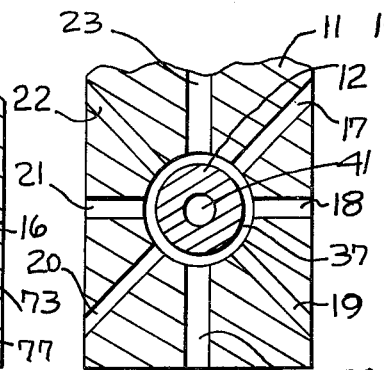
FIG. 4A–4L are sectional view taken along line IV—IV of FIG. 1 with the letters used to designate different positions of the valve spool.
Figure 5A:
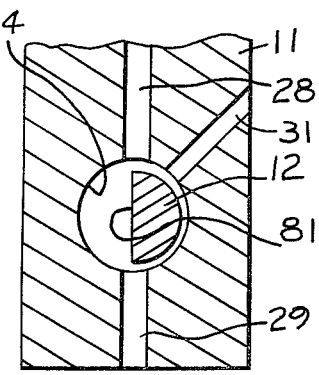
FIG. 5A–5L are sectional views taken along line V—V of FIG. 1 with the letters used to designate different positions of the valve spool.
Figure 3B:
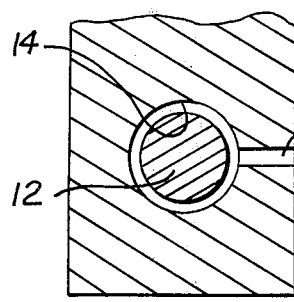

The body 11 has a bore 14 extending therethrough and a signal port 16, FIG. 3A, opening into the bore 14 at one end thereof. Referring to FIG. 4A, a plurality of signal ports 17,18,19,20,21,22 and a pair of drain ports 23,24 open into the bore 14, and are angularly spaced one from another in a plane normal to the axis of the bore 14 and longitudinally spaced from the signal port 16. As illustrated in this embodiment, the signal ports 17–22 and drain ports 23,24 are angularly spaced at 45° increments. An inlet passage 25 opens into the bore 14 and includes an annulus 26 in the bore 14 longitudinally spaced from the signal ports 17–22 and an inlet port 27 connected to the annulus 26. Another pair of drain ports 28,29 and another signal port 31, FIG. 5A opens into the bore 14 and are angularly spaced one from another in plane normal to the axis of the bore 14 and longitudinally spaced from the annulus 26.

The valve spool 12 is reciprocatably positioned in the bore 14 and is movable along its longitudinal axis to a plurality of positions indicated by letters A–L. The spool 12 has a plurality of lands 32,33,34 at an end portion 36 thereof. Lands 32,33 are separated by an annular groove 37 and lands 33,34 are being separated by an annular groove 38. Another pair of annular grooves 39,40 are provided on the spool 12 with groove 39 being adjacent land 32. A longitudinally extending chamber or manifold 41 is provided in the end portion 36 of the spool 12.

Figure 5F:
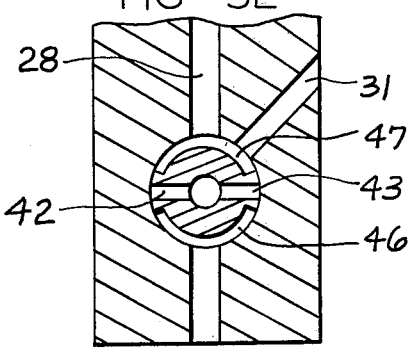

Referring to FIGS. 2 and 5F, the land 32 has a pair of radial passages 42,43 opening into the manifold 41 and angularly spaced one from another. A pair of arcuate pockets 46,47 are positioned between the radial passages 42,43 in circumferential alignment with the passages 42,43. As used herein, the phrase "circumferential alignment" is used whenever two or more elements of the spool 12 are in a plane normal to the axis of the spool 12.

Figure 4B:
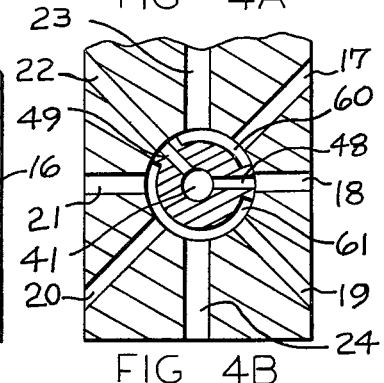
Figure 5B:
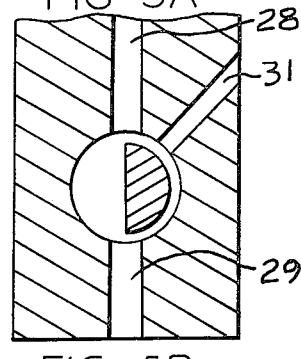
Figure 3C:
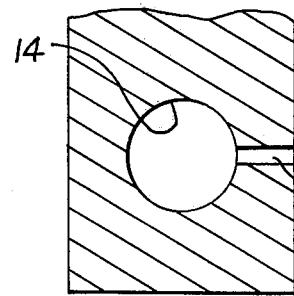
Figure 4C:
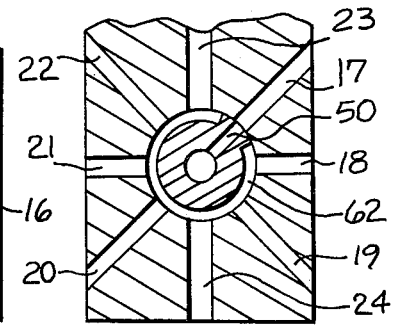
Figure 5C:
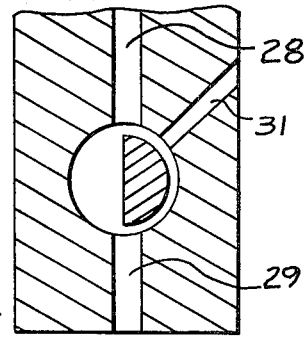
Figure 4D:
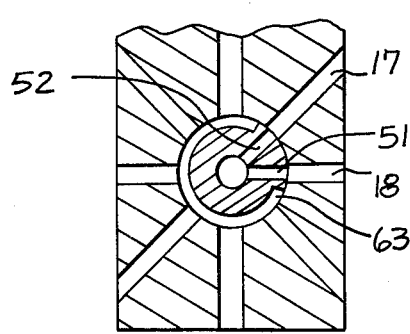
Figure 5D:
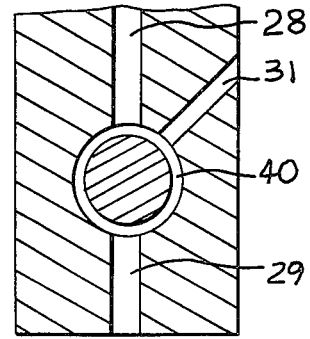
Figure 4E:
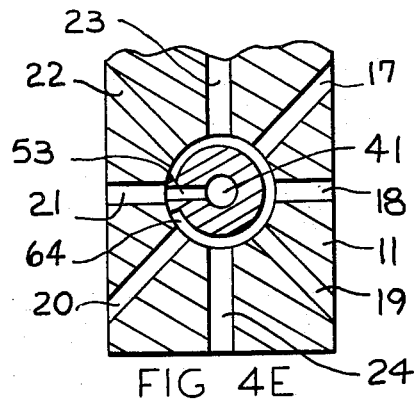
Figure 5E:
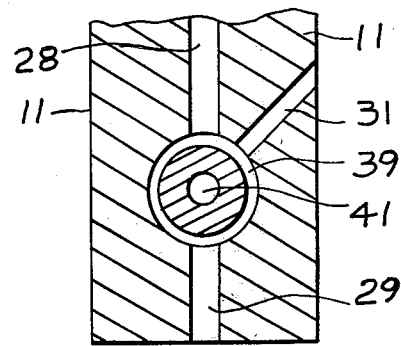
Figure 4F:
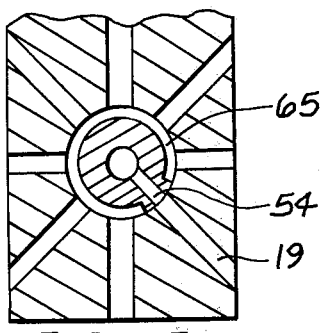
Figure 4G:
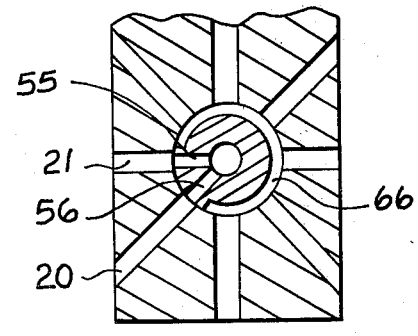
Figure 5G:
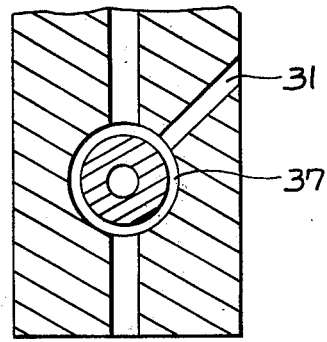
Figure 4H:
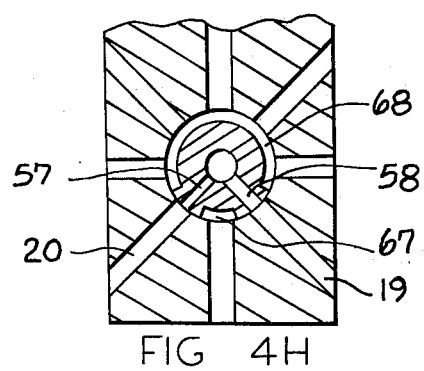
Figure 4I:
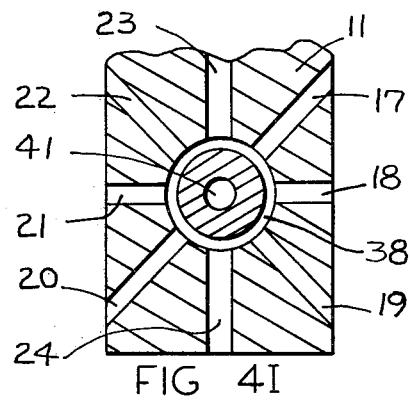

Referring now to FIG. 2 and FIGS. 4B through 4H, the land 33 has a plurality of radial passages 48–58 opening into the manifold 41 and a plurality of arcuate pockets 60–68 recessed therein. The radial passages 48,49 and arcuate pockets 60,61 are in circumferential alignment and as shown in FIG. 4B, radial passages 48 and 49 are in communication with signal ports 18 and 22 respectively with the spool 12 at position B. The radial passage 50 and arcuate pocket 62 are in circumferential alignment and as shown in FIG. 4C, radial passage 50 is in communication with signal port 17 with spool 12 at position C. The radial passages 51,52 and arcuate pocket 63 are in circumferential alignment and as shown in FIG. 4D, radial passages 51 and 52 are in communication with signal ports 18 and 17 respectively with the spool 12 at position D. The radial passage 53 and arcuate pocket 64 are in circumferential alignment and as shown in FIG. 4E, radial passage 53 is in communication with signal port 21 with the spool 12 at position E. The radial passage 54 and arcuate pocket 65 are in circumferential alignment and as shown in FIG. 4F, radial passage 54 is in communication with signal port 19 with valve spool 12 at position F. The radial passages 55,56 and arcuate pocket 66 are in circumferential alignment and as shown in FIG. 4G, radial passages 55 and 56 are in communication with signal ports 21 and 20 respectively with the spool 12 at position G. The radial passages 57,58 and arcuate pocket 67,68 are in circumferential alignment and as shown in FIG. 4H, radial passages 57 and 58 are in communication with signal ports 20 and 19 respectively with the spool 12 at position H.

Figure 5H:
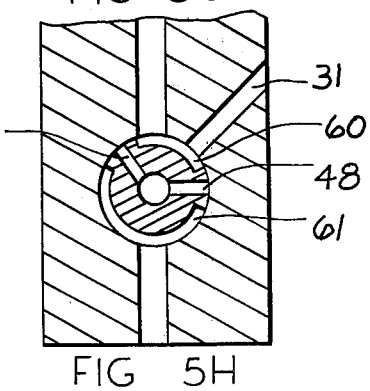
Figure 5I:
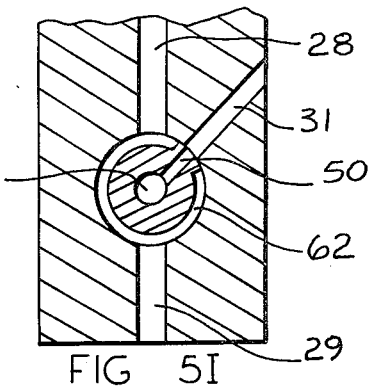
Figure 5J:
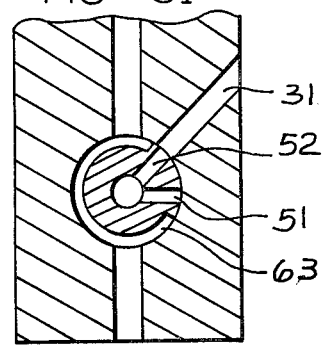

As shown in FIG. 5I, radial passage 50 is in communication with signal port 31 with the spool 12 at position I. As shown in FIG. 5J, the radial passage 52 is in communication with the signal port 31 with the spool 12 at position J.

Figure 4J:
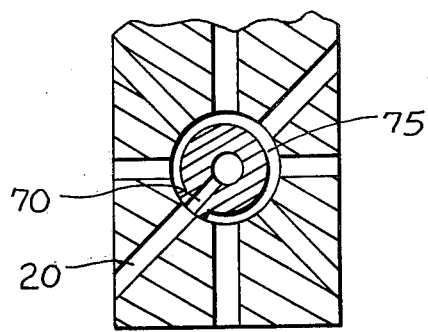
Figure 4K:
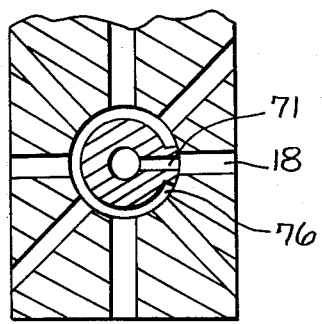
Figure 5K:
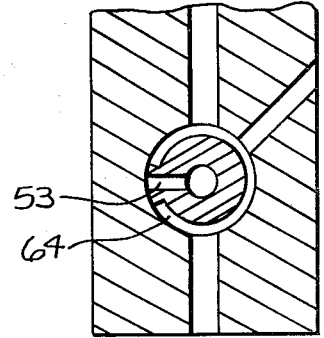
Figure 4L:
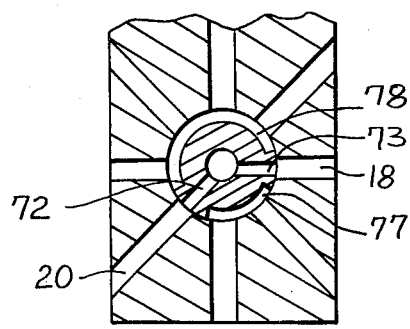
Figure 5L:
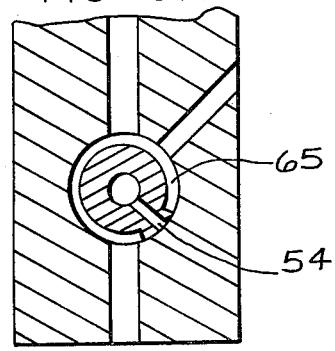

The land 34 has a plurality of radial passages 70–73 opening into the manifold 41 and a plurality of arcuate pockets 75–78 recessed therein. The radial passage 70 and arcuate pocket 75 are in circumferential alignment and as shown in FIG. 4J, passage 70 is in communication with signal port 20 with spool 12 at position J. The radial passage 71 and arcuate pocket 76 are in circumferential alignment and as shown in FIG. 4K, the radial passage 71 is in communication with signal port 18 with the spool 12 at position K. The radial passages 72,73 and arcuate pockets 77,78 are in circumferential alignment and as shown in FIG. 4L, radial passages 72 and 73 are in communication with signal ports 20 and 18 respectively with the spool 12 at position L. As shown in FIG. 3A, the radial passage 73 is in communication with the signal port 16 with the spool at position A.

A flat guide surface 81 is provided on the opposite end portion 82 of the valve spool 12 and cooperates with a guide element, not shown, in the usual manner to prevent the spool 12 from rotating within the bore 14. This maintains the particular relationship of the various radial passages in the spool and the signal ports in the body as shown in the drawings. The end portion 82 has a plurality of longitudinally spaced grooves 83 formed thereon for a later defined purpose. A tang 84 is connected to the end of the valve spool 12 and is adapted to be connected to a mechanism for actuating the valve spool 12 between the various positions.

The detent means 13 includes the grooves 83 and a pair of detent mechanisms 86 positioned within a pair of bore 87 opening into and extending transverse to the axis of the bore 14. Each of the detent mechanisms 86 is of conventional construction and has a ball 88 resiliently urged into registry with one of the grooves 83 which correspond with an actuated position of the valve spool 12.

INDUSTRIAL APPLICABILITY

In use, the valve spool 12 is selectively movable longitudinally along its axis between twelve positions for selectively establishing a signal flow path from the inlet passage 25 with one or more of the signal ports and a drain flow path or paths from the other signal ports to the drain ports. In this context the bore 14 at the left end of the valve body 11 can open into the reservoir and in this embodiment can be considered part of the drain path. The table hereinafter set forth enumerates the elements making up the signal flow paths and the drain flow paths at the various positions of the valve spool.

| SPOOL POS. | SIGNAL FLOW PATH(S) | DRAIN FLOW PATHS |
|---|---|---|
| A | 25, 42/43, 41, 73, 16 | (1) 17, 18, 19, 20, 21, 22, 37, 23/24; (2) 31, 14, 28/29 |
| B | 25, 42/43, 41, 48, 18 & 49, 22 | (1) 19, 20, 21, 61, 24; (2) 17, 60, 23; (3) 31, 28/29; (4) 16, 14 |
| C | 25, 48/49, 41, 50, 17 | (1) 18, 19, 20, 21, 22, 62, 23/24; (2) 31, 14, 28/29; (3) 16, 14 |
| D | 25, 48/49/50, 41, 51, 18 & 52, 17 | (1) 19, 20, 21, 22, 63, 23/24; (2) 31, 40, 28/29; (3) 16, 14 |
| E | 25, 50/51/52, 41, 53, 21 | (1) 17, 18, 19, 20, 22, 64, 23/24; (2) 31, 39, 28/29; (3) 16, 14 |
| F | 25, 51/52/53, 41, 54, 19 | (1) 17, 18, 20, 21, 22, 65, 23/24; (2) 31, 47, 28; (3) 16, 14 |
| G | 25, 53/54, 41, 56, 20 & 55, 21 | (1) 17, 18, 19, 22, 66, 23/24; (2) 31, 37, 28/29; (3) 16, 14 |
| H | 25, 54/55/56, 41, 58, 19 & 57, 20 | (1) 17, 18, 21, 22, 68, 23; (2) 31, 60, 28; (3) 16, 14 |
| I | 25, 55/56/57/58, 41, 50, 31 | (1) 17, 18, 19, 20, 21, 22, 38, 23/24; (2) 16, 14 |
| J | (1) 25, 57/58, 41, 70, 20; (2) 25, 57/58, 41, 52, 31 | (1) 17, 18, 19, 21, 22, 75, 23/24; (2) 16, 14 |
| K | 25, 70, 41, 71, 18 | (1) 17, 19, 20, 21, 22, 76, 23/24; (2) 31, 64, 28/29; (3) 16, 14 |
| L | 25, 70/71, 41, 73, 18 & 72, 20 | (1) 19, 77, 24; (2) 17, 21, 22, 78, 23; (3) 16, 14 |

Referring to the table and drawings and remembering that all of the radial passages in the valve spool 12 are in communication with the manifold 41, it can be seen that at position A of the valve spool 12, the inlet passage 25 is in communication with the radial passages 42 and 43 in the land 32 of the spool 12, and radial passage 73 in the land 34 of the spool 12 is in communication with the signal port 16 to establish a signal flow path from the inlet passage 25 to the signal port 16. Further, the signal ports 17–22 are in communication with the drain ports 23–24 through the annular groove 37 and the signal port 31 is in communication with the drain ports 28 and 29 through a portion of the bore 14 to establish two separate drain flow paths. The remaining radial passages in the spool 12 are blocked by the wall surface of the bore 14.

From the above description and operation it will be readily recognized by one skilled in the art that numerous variations of the above radial passages and signal ports are possible without departing from the inventive concept. For example, in one form of the invention, the valve body 11 may have only two signal ports, 17 and 18 for example, and one drain port, either 23 or 24. Thus, at position A of the valve spool 12, both signal ports 17 and 18 will be connected to the drain port through the annular groove 37. At position B of the valve spool, the signal flow path will be from the inlet passage 25 to the signal port 18 while the drain flow path will be from the signal port 17 to the drain port 23 or 24 through an arcuate pocket. At position C of the valve spool, the signal flow path would be from the inlet passage 25 through the radial passage 48, manifold 41, and radial passage 50 to signal port 17. A drain flow path would be established from signal port 18 through arcuate pocket 61 and to the drain port 23 or 24.

The above described invention is particularly useful in controlling a multi-speed power shift transmission wherein the inlet port 27 is connected to a source of pressurized fluid and the signal ports are connected to shuttle valves to deliver a pressurized signal or signals to one or more of the shuttle valves while connecting the remaining shuttle valves to drain. The shuttle valves in turn control the flow of pressurized fluid to the various clutches of the transmission.

Other aspects, objects, and advantages of this invention can be obtained from a study of the drawings, the disclosure and the appended claims.

We claim:

1. A selector valve (10) comprising:
 a body (11) having a bore (14), first and second signal ports (18,17), a drain port (23), and an inlet passage (25), said first and second signal ports (18,17) and said drain port (23) opening into the bore (14) and being angularly spaced one from another in a plane transverse to the axis of the bore (14), said inlet passage (25) being in communication with the bore (14) and longitudinally spaced from the signal ports (18,17) and the drain port (23); and
 a spool (12) having a manifold (41), first and second lands (32,33), an annular groove (37) positioned between said first and second lands (32,33), said first land (32) having a radial passage (42/43), said second land (33) having a first radial passage (48) and a first arcuate pocket (60) in circumferential alignment and a second radial passage (50) and a second arcuate pocket (62) in circumferential alignment and being longitudinally spaced from the first radial passage (48) and first pocket (60), said first and second radial passages (42/43,48,50) being in communication with said manifold (41), said spool (12) being reciprocatably positioned within the bore (14) and movable longitudinally between a first position (A) at which the first and second signal ports (18,17) are in communication with the drain port through the annular groove (37), a second position (B) at which the radial passage (42/43) of the first land (32) is in communication with the inlet passage (25), the first radial passage (48) of the second land (33) is in communication with the first signal port (18), and the second signal port (17) is in communication with the drain port (23) through the first arcuate pocket (60) in the second land (33), and to a third position (C) at which the first radial passage (48) of the second land (33) is in communication with the inlet passage (25), the second radial passage (50) of the second land (33) is in communication with the second signal port (17) and the first signal port (18) is in communication with the drain port (23) through the second arcuate pocket (62) of the second land (33).

2. The selector valve (10) of claim 1 wherein said second land (33) has third and fourth radial passages (51,52) angularly spaced one from another in a plane normal to the axis of the spool and longitudinally spaced from the second radial passage (50), said third and fourth passages (51,52) being in communication with the manifold (41), said spool (12) being movable to a fourth position (D) at which the inlet passage (25) is in communication with at least one of the first and second radial passages (48,50) in the second land (32) and the first and second signal ports (18,17) are in communication with the third and fourth radial passages (51,52) respectively.

3. The selector valve (10) of claim 2 wherein said body (11) has a third signal port (21) opening into the bore (14) and positioned in the first plane between one of said first and second signal ports (18,17) and said drain port (23), said second land (33) of said spool (12) having a third arcuate pocket (63) between and in circumferential alignment with the third and fourth radial passages (51,52), said third signal port (21) being in communication with said drain port (23) through the third arcuate pocket (63) at the fourth position of the spool (12).

4. The control valve of claim 3 wherein said second land (33) of said spool (12) has a fifth radial passage (53) in communication with the manifold (41) and longitudinally spaced from the third and fourth radial passages (51,52), a fourth arcuate pocket (64) in circumferential alignment with the fifth radial passage (53), said spool (12) being movable to a fifth position (E) at which said inlet passage (25) is in communication with at least one of the second, third and fourth radial passages (50,51,52) in the second land (33), said third signal port (21) is in fluid communication with the fifth radial passage (53) and said first and second signal ports (18,17) are in communication with the drain port (23) through the fourth arcuate pocket (64) in the second land (33).

5. The selector valve (10) of claim 1 wherein said body (11) has another signal port (16) opening into the bore (14) and longitudinally spaced from said first and second signal ports (18,17) and said spool (12) has a third land (34) and a radial passage (73) in communication with the manifold (41), said other signal port (16) being in communication with the radial passage (73) in the third land (34) and said radial passage (42/43) in the first land (32) being in communication with the inlet passage (25) at the first position (A) of the spool (12).

6. The selector valve (10) of claim 1 wherein said body (11) has another signal port (31) opening into said bore (14) and longitudinally spaced from said first and second ports (18,17), said spool being movable to another position (I) at which the second radial passage (50) in the second land (32) is in communication with the other signal port (31).

7. The selector valve (10) of claim 6 wherein said spool (12) has a second annular groove (38) adjacent the second land (33), said second land having another radial passage (57/58) in communication with said manifold (41) and longitudinally spaced from said second radial passage (50) in the second land (33), said first and second signal ports (18,17) and said drain port (23) being in communication with the second annular groove (38) and said other radial passage (57/58) in said second land (33) being in communication with the inlet passage (22) at the other position of the spool (12).

* * * * *